United States Patent
Wey (10) Patent No.: US 8,994,289 B2
(45) Date of Patent: Mar. 31, 2015

(54) LED DRIVE CIRCUIT

(71) Applicant: En-Mien Hsieh, Zhubei, Hsinchu County (TW)

(72) Inventor: Chin-Der Wey, Zhongli (TW)

(73) Assignee: En-Mien Hsieh, Zhubei, Hsinchu County (TW)

( * ) Notice: Subject to any disclaimer, the term of this patent is extended or adjusted under 35 U.S.C. 154(b) by 52 days.

(21) Appl. No.: 13/793,894

(22) Filed: Mar. 11, 2013

(65) Prior Publication Data
US 2014/0145632 A1    May 29, 2014

(30) Foreign Application Priority Data

Nov. 26, 2012 (TW) .............................. 101144131 A (51) Int. Cl.
*H05B 37/02* (2006.01)
*H05B 33/08* (2006.01)

(52) U.S. Cl.
CPC ........ *H05B 33/0815* (2013.01); *H05B 33/0812* (2013.01); *H05B 33/0824* (2013.01); *Y02B 20/40* (2013.01); *Y02B 20/346* (2013.01)
USPC ........... 315/294; 315/291; 315/307; 315/308; 315/209 R; 315/210

(58) Field of Classification Search
CPC ..... H05B 41/46; H05B 41/3925; G01N 21/67
USPC ......... 315/122, 224, 172, 291, 294, 307, 308, 315/185 R, 209 R, 210
See application file for complete search history.

(56) References Cited

U.S. PATENT DOCUMENTS

| | | | | |
|---|---|---|---|---|
| 8,373,346 B2* | 2/2013 | Hoogzaad et al. | ........ | 315/185 R |
| 8,395,329 B2* | 3/2013 | Jutras et al. | .................... | 315/291 |
| 8,410,717 B2* | 4/2013 | Shteynberg et al. | .......... | 315/291 |
| 8,575,630 B2* | 11/2013 | Ito et al. | .......................... | 257/88 |
| 8,602,587 B2* | 12/2013 | Lee et al. | ..................... | 362/225 |
| 8,638,045 B2* | 1/2014 | Kunst et al. | .................... | 315/291 |
| 8,711,444 B2* | 4/2014 | Oyama | ......................... | 358/475 |
| 8,847,516 B2* | 9/2014 | Chobot | ......................... | 315/307 |
| 2007/0024211 A1* | 2/2007 | Rimmer et al. | ................ | 315/291 |
| 2011/0068702 A1* | 3/2011 | van de Ven et al. | ............ | 315/186 |
| 2011/0074292 A1* | 3/2011 | Maehara | .......................... | 315/32 |
| 2011/0316011 A1* | 12/2011 | Ito et al. | .......................... | 257/88 |
| 2012/0153833 A1* | 6/2012 | Mikani et al. | ................. | 315/122 |
| 2012/0236373 A1* | 9/2012 | Oyama | ......................... | 358/475 |

* cited by examiner

*Primary Examiner* — Thuy Vinh Tran
*Assistant Examiner* — Syed M Kaiser
(74) *Attorney, Agent, or Firm* — Muncy, Geissler, Olds & Lowe, P.C.

(57) ABSTRACT

An LED drive circuit comprises a power supply unit, a first LED lamp string, a first voltage control unit, a second LED lamp string and a first power transfer unit. The power supply unit outputs a drive power to drive the first LED lamp string. The first voltage control unit gets the drive power and stabilizes and provides the voltage to the first LED lamp string. The first voltage control unit includes a power switch where the drive power generates a power loss. The second LED lamp string and first power transfer unit are coupled in series with the first voltage control unit so that the power loss is transferred and output to drive the second LED lamp string. Thus loss of the drive power is reduced and lighting efficiency of the LED improves.

9 Claims, 14 Drawing Sheets

LED DRIVE CIRCUIT

FIELD OF THE INVENTION

The present invention relates to a circuit and particularly to an LED drive circuit.

BACKGROUND OF THE INVENTION

Figure 1:
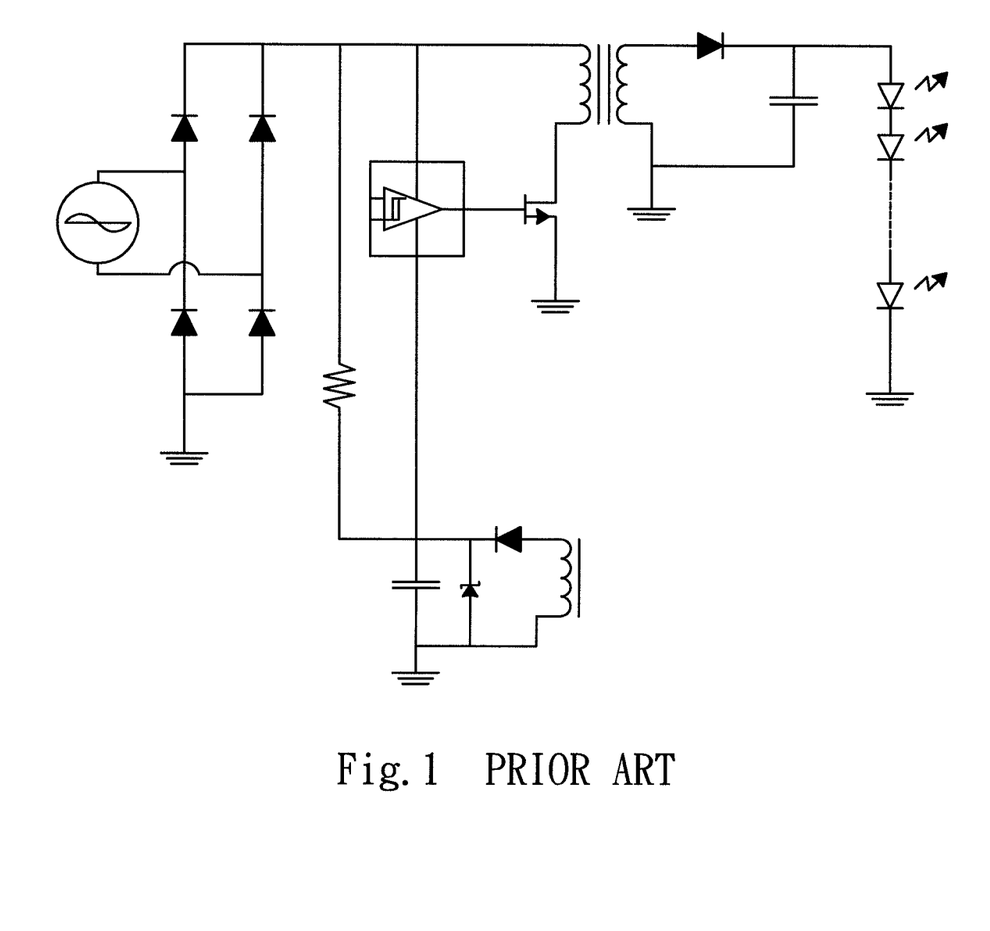
FIG. 1 is a schematic circuit diagram of a conventional LED drive circuit.

Conventional LED drive circuits typically are designed by adopting a switch-type power converter. Referring to FIG. 1, it employs a semiconductor power switch to switch low frequency AC or DC power signals to high frequency DC drive signals usable for LEDs. Such a high frequency conversion wastes a lot of energy on different converter elements and results in power loss. Moreover, the high frequency switch creates signal interference that requires more elements to suppress. As the prevailing trend of products mainly focuses on energy-saving and miniaturization, the structure of the switch-type power converter cannot fully meet the requirement of LED drive circuits.

Furthermore, the common voltage regulator circuit is typically used for constant current control that is widely adopted. The voltage regulator must share significant energy with the controlled constant current load to get desired control effect. As a result, it also consumes a lot of power that becomes a great concern for designing the power converter. When in use, in the voltage regulator circuits, the more power consumption of the elements, the higher the temperature. If the voltage regulator circuit is adopted in the LED drive circuits, the greater cooling mechanism is needed. This disobeys the requirements of energy-saving and miniaturization of the products. Thus there are still rooms for improvement.

SUMMARY OF THE INVENTION

The primary object of the present invention is to solve the problems of excessive power loss and easy interference occurring to the conventional LED drive circuits that adopt switch-type power converters.

Another object of the invention is to solve the problem of the conventional LED drive circuits that adopt a voltage regulator circuit that renders higher temperature caused by too much power loss and results in difficulty in product miniaturization because of the constraint of the cooling mechanism.

To achieve the foregoing objects, the present invention provides an LED drive circuit comprising a power supply unit, a first LED lamp string, a first voltage control unit, a second LED lamp string and a first power transfer unit. The power supply unit includes an output end to output drive power. The first LED lamp string is connected to the output end to receive the drive power to be driven, and includes a first anode end connected to the output end and a first cathode end. The first voltage control unit is connected to the first cathode end to get the drive power and stabilize and provide the voltage to the first LED lamp string. The first voltage control unit includes a power switch. The drive power generates a power loss on the power switch. The second LED lamp string is connected to the first voltage control unit. The first power transfer unit bridges the second LED lamp string and first voltage control unit.

The first power transfer unit transfers the power loss generated on the power switch to the second LED lamp string for driving thereof.

Thus, through the technique set forth above, the invention can provide at least the following advantages:

1. Through the first voltage control unit, the problems of excessive power loss and easy interference occurring to the conventional switch-type power converter can be averted.

2. By connecting the first power transfer unit and second LED lamp string to the first voltage control unit, the power loss originally consumed at the power switch is transferred and output to drive the second LED lamp string. This not only resolves the problem of providing an extra cooling mechanism due to the high temperature caused by too much power loss of the power switch, the product also can be miniaturized. With the power loss used for lighting the second LED lamp string, lighting efficiency of the drive circuit is enhanced. Hence it also can utilize energy resources more efficiently and save energy.

3. By dispensing with the switch-type power converter, the invention can be structured simpler at a lower cost, and also can be operated at a lower temperature and stably.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 2:
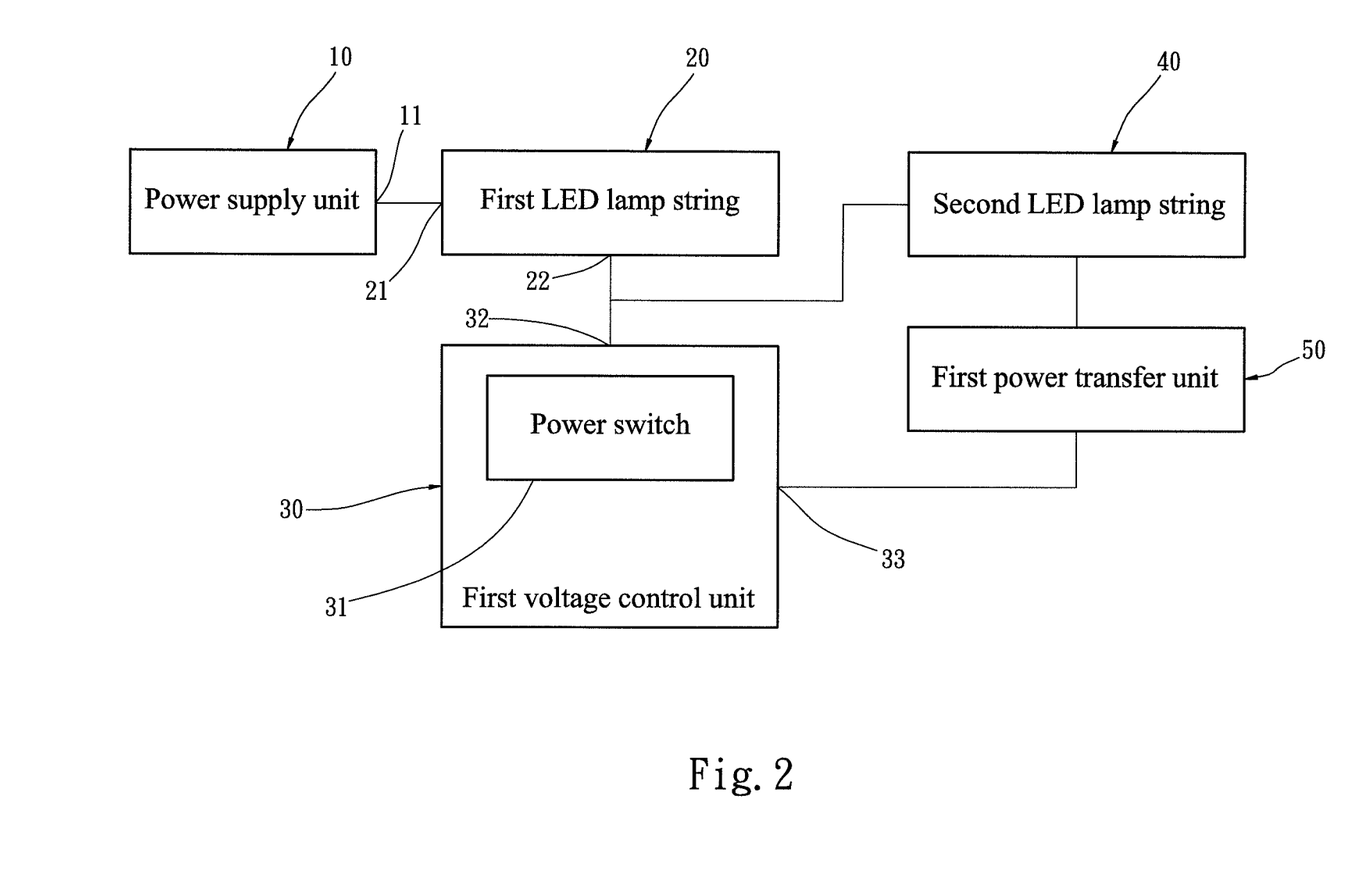
FIG. 2 is a schematic circuit block diagram of the invention.

Please refer to FIG. 2 for a circuit block diagram of the invention. It is an LED drive circuit comprising a power supply unit 10, a first LED lamp string 20, a first voltage control unit 30, a second LED lamp string 40 and a first power transfer unit 50. The power supply unit 10 includes an output end 11 to output drive power. The first LED lamp string 20 is connected to the output end 11 to receive the drive power to be driven, and includes a first anode end 21 connected to the output end 11 and a first cathode end 22. The first voltage control unit 30 is connected to the first cathode end 22 to get the drive power and stabilize and provide the voltage to the first LED lamp string 20. The first voltage control unit 30 includes a control end 32, a feedback end 33 and a power switch 31 connecting to the control end 32 and feedback end 33. The drive power generates a power loss on the power switch 31. The second LED lamp string 40 is connected to the first voltage control unit 30. The first power transfer unit 50 bridges the second LED lamp string 40 and first voltage control unit 30 to form a serial connection with the second LED lamp string 40, and also bridges the control end 32 and feedback end 33 with the second LED lamp string 40. Thereby, the first power transfer unit 50 transfers and outputs the power loss generated on the power switch 31 to the second LED lamp string 40 for driving thereof.

Figure 3:
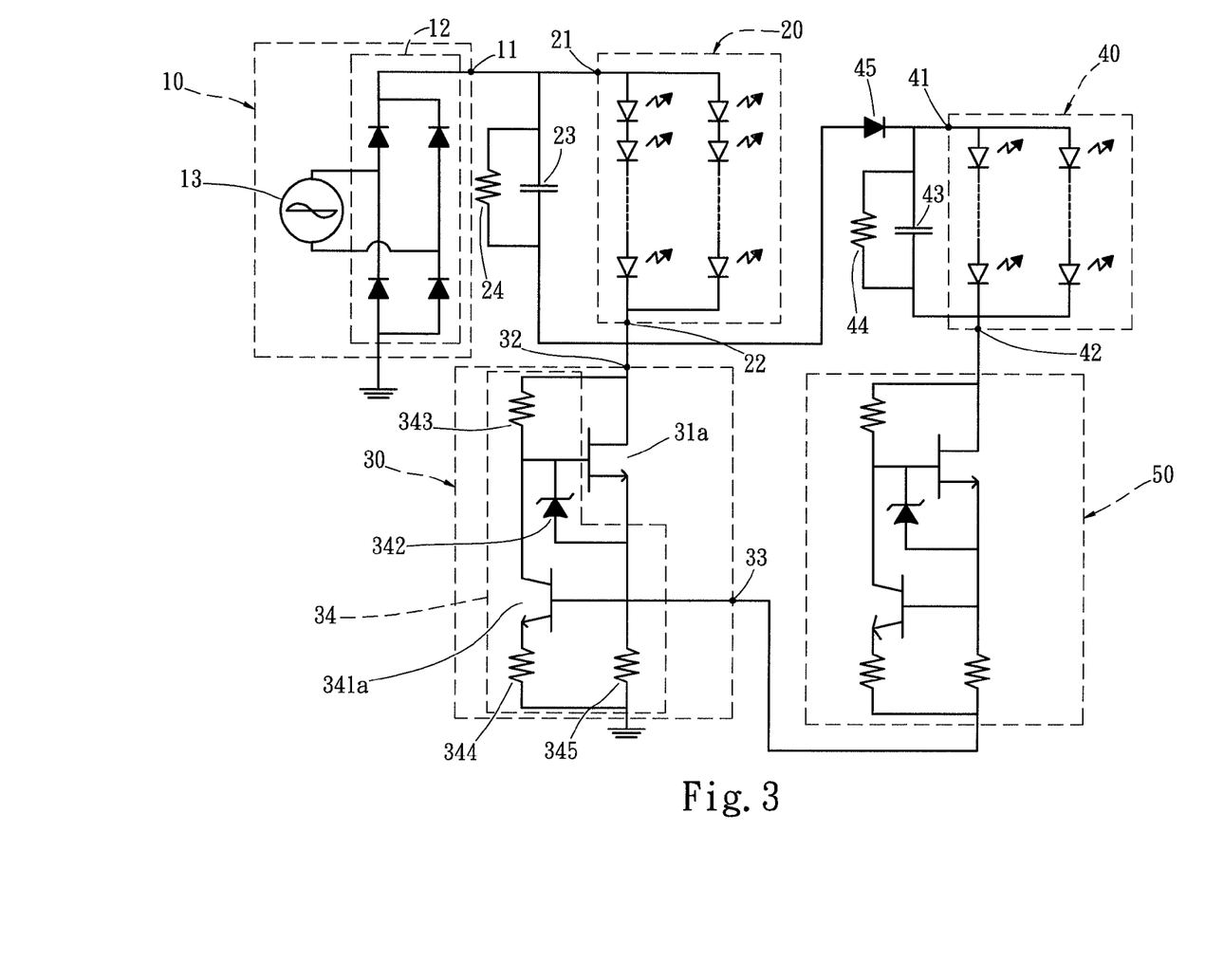
FIG. 3 is a schematic circuit diagram of a first embodiment of the invention.

Please refer to FIG. 3 for the circuit diagram of a first embodiment of the invention. In this embodiment the first LED lamp string 20 is coupled in parallel with a first capacitor 23 and a first resistor 24 to filter out ripple waves and get a stable DC current. The first anode end 21 is connected to the output end 11 of the power supply unit 10. The power supply unit 10 includes a full bridge rectifier 12 and an AC power source 13 connected to the full bridge rectifier 12. The first voltage control unit 30 is connected to the first cathode end 22 of the first LED lamp string 20. The second LED lamp string 40 is connected to the first voltage control unit 30, and includes a second anode end 41 and a second cathode end 42. In this embodiment the second anode end 41 is connected to the first voltage control unit 30 via a rectification diode 45, and the second LED lamp string 40 also is coupled in parallel with a second capacitor 43 and a second resistor 44. The first power transfer unit 50 bridges the second cathode end 42 of the second LED lamp string 40 and the first voltage control unit 30, and has the same circuit structure as the first voltage control unit 30.

In this embodiment, the first voltage control unit 30 includes the power switch 31a and a control circuit 34 connecting to the power switch 31a. The power switch 31a is an N-type power switch in this embodiment. The control circuit 34 includes a Zener diode 342, a third resistor 343, a voltage stabilization element 341a, a fourth resistor 344 and a fifth resistor 345. The Zener diode 342 is connected to the gate of the power switch 31a to provide voltage stabilization protection for the power switch 31a. The third resistor 343 bridges the gate of the power switch 31a and control end 32. The voltage stabilization element 341a is an NPN transistor here and connected to the gate of the power switch 31a. The fourth resistor 344 is connected to the emitter of the NPN transistor. The fifth resistor 345 is connected to the gate of the NPN transistor. The AC power source 13 is rectified through the full bridge rectifier 12 to generate a DC voltage supplied to the first LED lamp string 20 for emitting light. The control current of the first voltage control unit 30 is a constant current, hence the first LED lamp string 20 can stably emit light a constant luminosity. The power loss on the power switch 31a is transferred to the second LED lamp string 40 and first power transfer unit 50 to drive the second LED lamp string 40.

Figure 4:
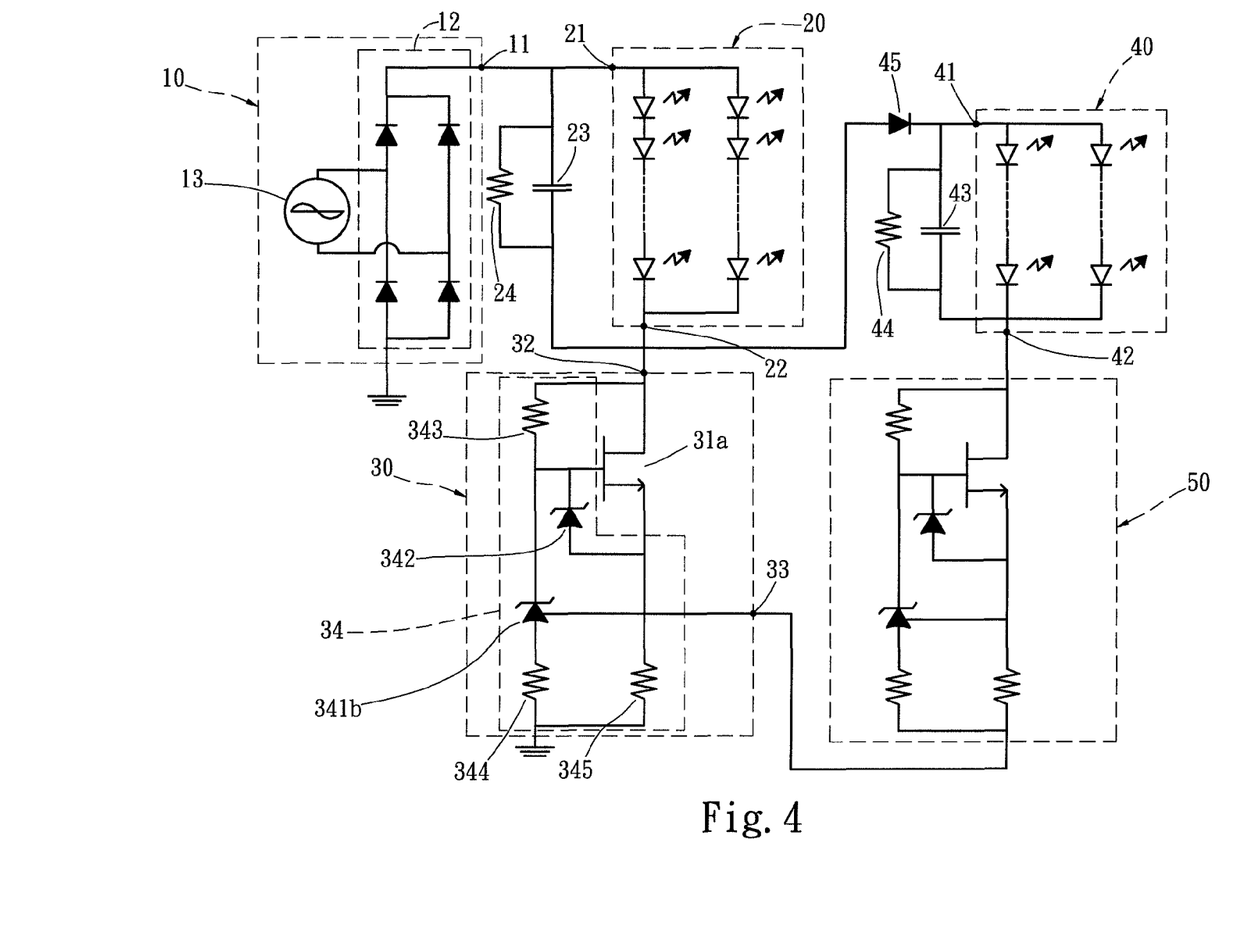
FIG. 4 is a schematic circuit diagram of a second embodiment of the invention.

Please refer to FIG. 4 for the circuit diagram of a second embodiment of the invention. It differs from the first embodiment by replacing the NPN transistor by a three-end voltage regulator to be the voltage stabilization element 341b. The three-end voltage regulator has a gate connecting to the fifth resistor 345 to provide a stable voltage for the fifth resistor 345.

Figure 5:
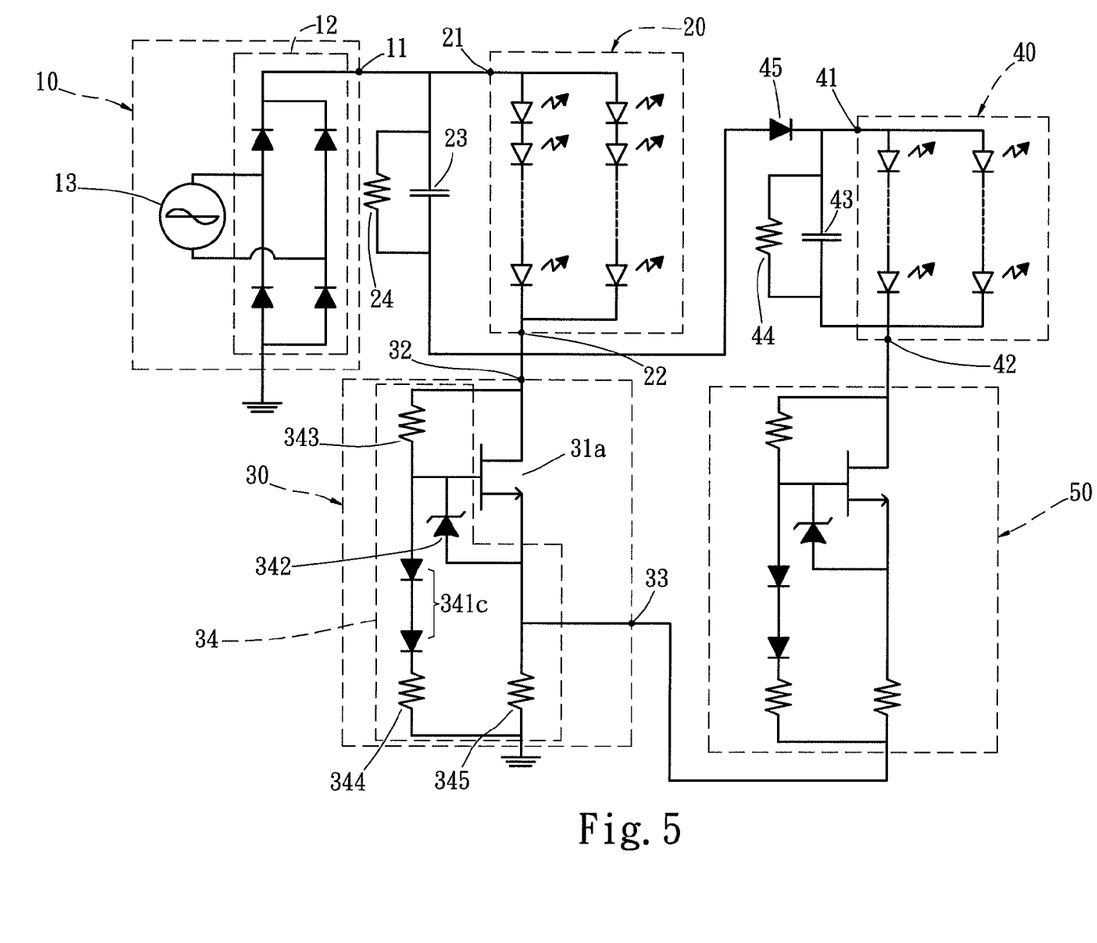
FIG. 5 is a schematic circuit diagram of a third embodiment of the invention.

Please refer to FIG. 5 for the circuit diagram of a third embodiment of the invention. It differs from the first embodiment by replacing the NPN transistor by serial-connected diodes to be the voltage stabilization element 341c. The serial-connected diodes provide a stable voltage for the fifth resistor 345 as well.

Figure 6:
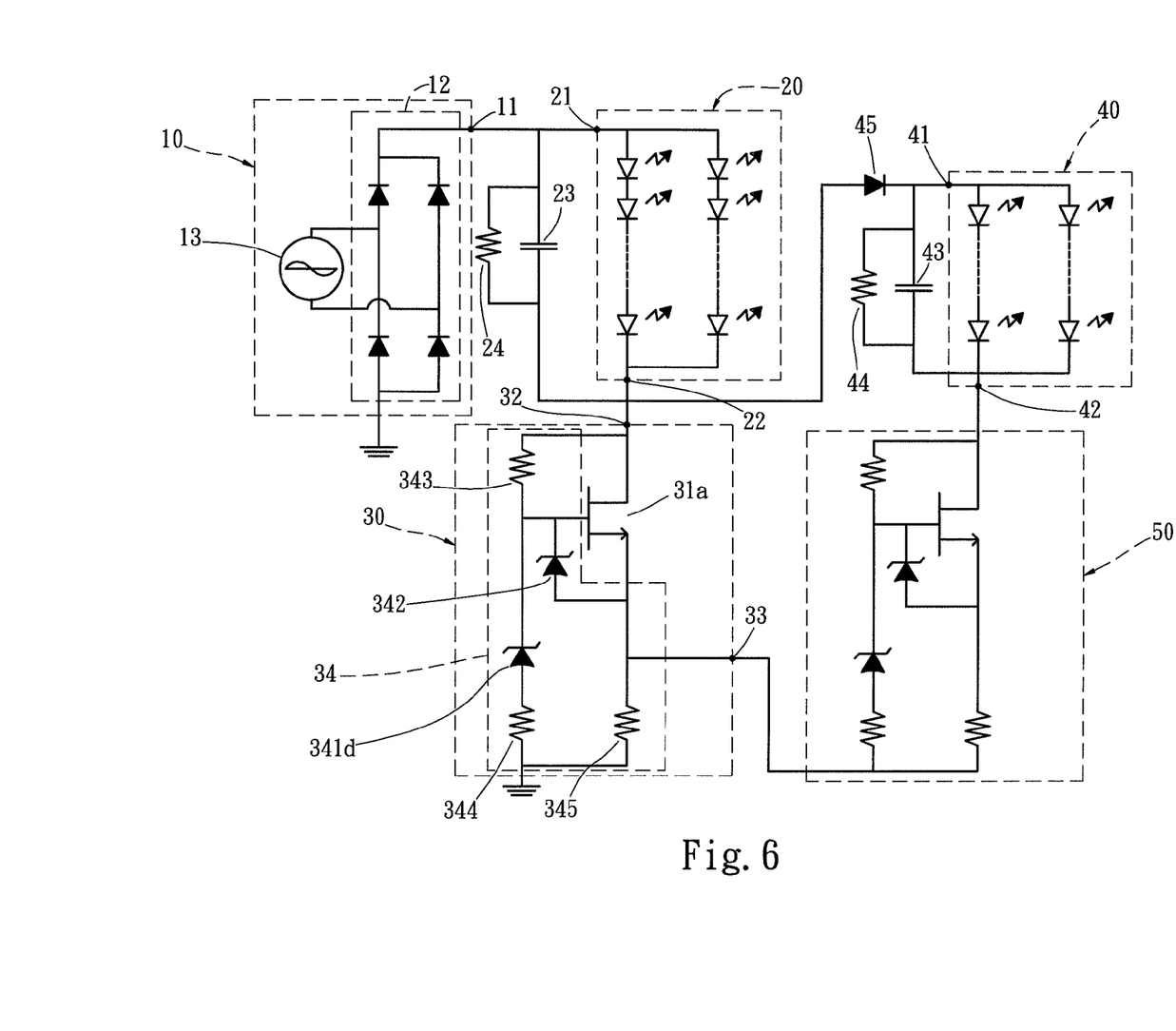
FIG. 6 is a schematic circuit diagram of a fourth embodiment of the invention.

Please refer to FIG. 6 for the circuit diagram of a fourth embodiment of the invention. It differs from the first embodiment by replacing the NPN transistor by a Zener diode to be the voltage stabilization element 341d. The Zener diode also can provide a stable voltage for the fifth resistor 345.

Figure 7:
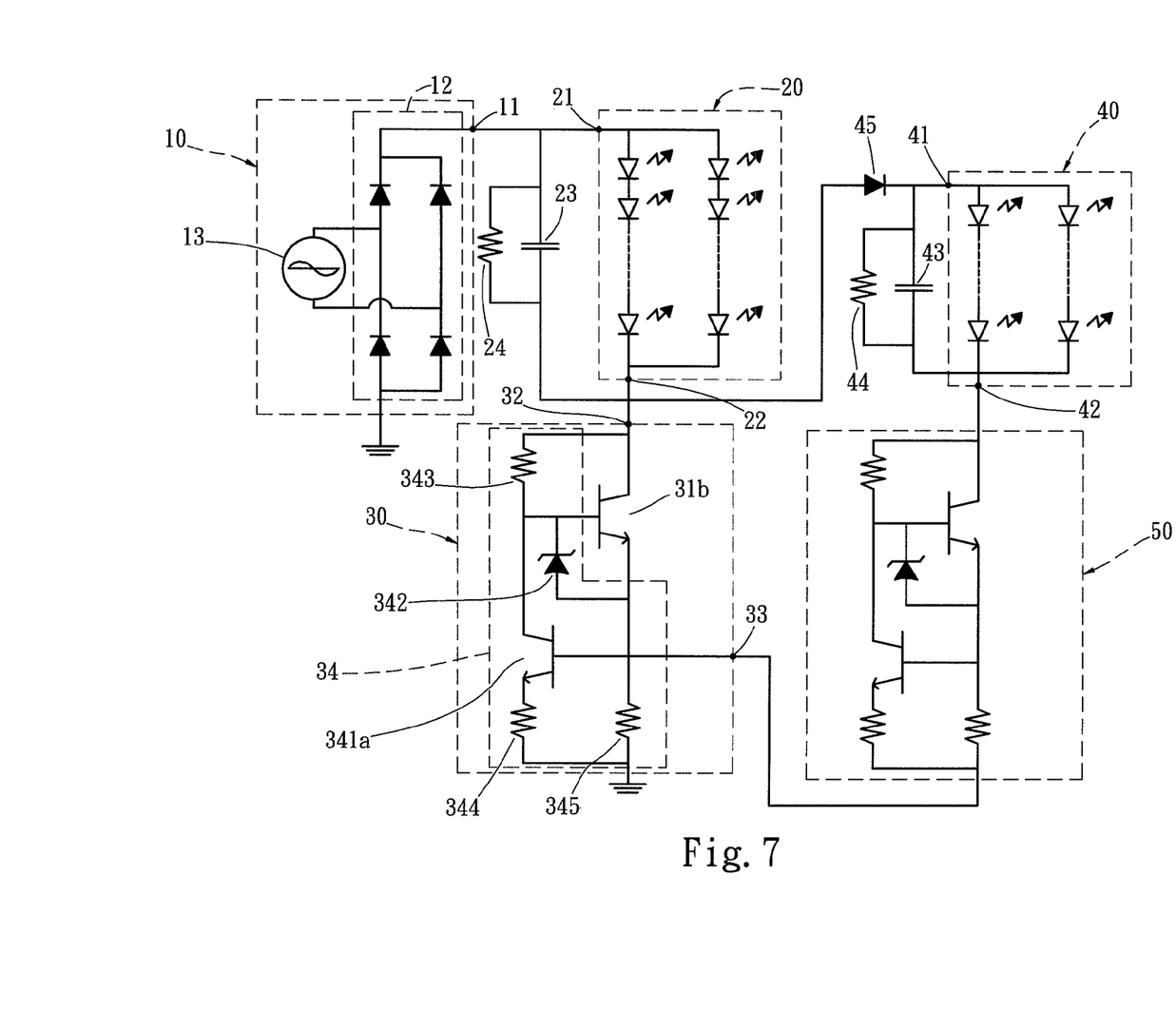
FIG. 7 is a schematic circuit diagram of a fifth embodiment of the invention.

Please refer to FIG. 7 for the circuit diagram of a fifth embodiment of the invention. It differs from the first embodiment by replacing the N-type power switch by an NPN transistor to be the power switch 31b.

Figure 8:
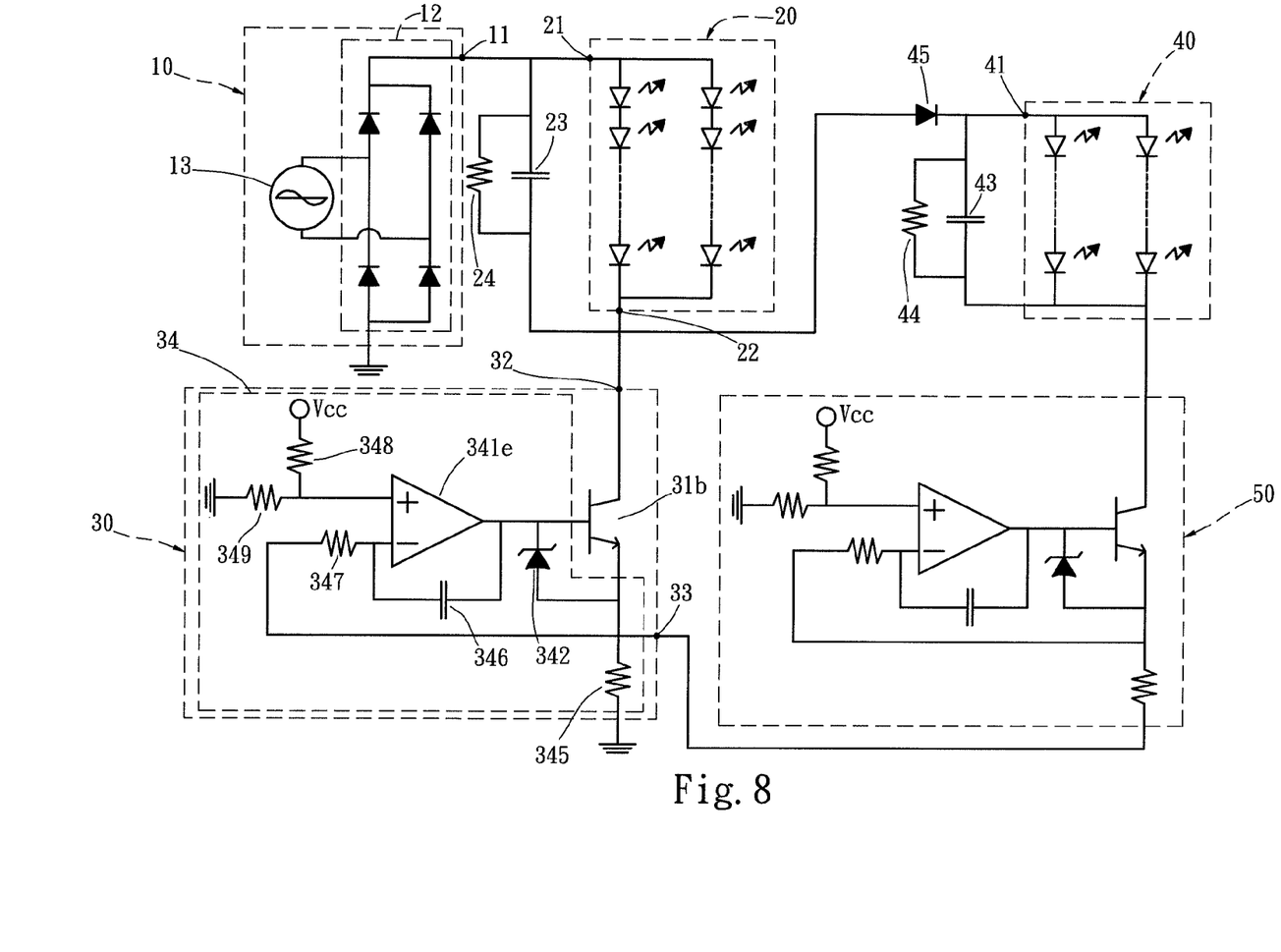
FIG. 8 is a schematic circuit diagram of a sixth embodiment of the invention.

Please refer to FIG. 8 for the circuit diagram of a sixth embodiment of the invention. It differs from the fifth embodiment by including an integration circuit in the control circuit 34 of the first voltage control unit 30 and replacing the NPN transistor in the integration circuit by an operational amplifier to be the voltage stabilization element 341e. The operational amplifier is connected to the base of the power switch 31b, the cathode of the Zener diode and a third capacitor 346. The third capacitor 346 has another end connecting to the inverse end of the operational amplifier and a sixth resistor 347 connecting to the fifth resistor 345. The sixth resistor 347 and the anode of the Zener diode 342 are connected to the feedback end 33. The non-inverse ends of the operational amplifier are connected to a seventh resistor 348 connecting to a DC voltage end and an eighth resistor 349 connecting to a ground end.

Figure 9:
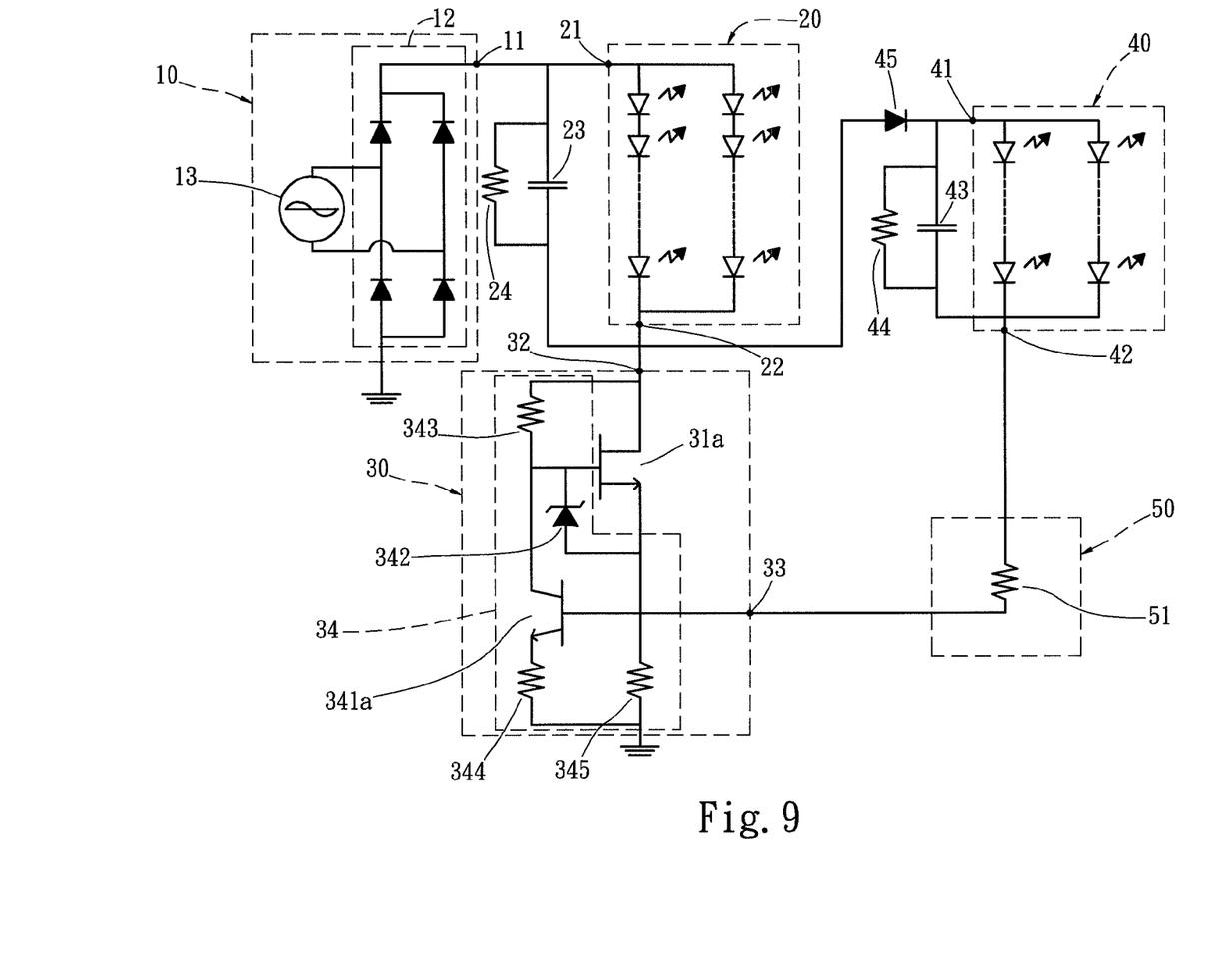
FIG. 9 is a schematic circuit diagram of a seventh embodiment of the invention.

Please refer to FIG. 9 for the circuit diagram of a seventh embodiment of the invention. It differs from the first embodiment by using a transistor 51 as the first power transfer unit 50 which is a current limit resistor, thus has a circuit structure different from the first voltage control unit 30.

Figure 10:
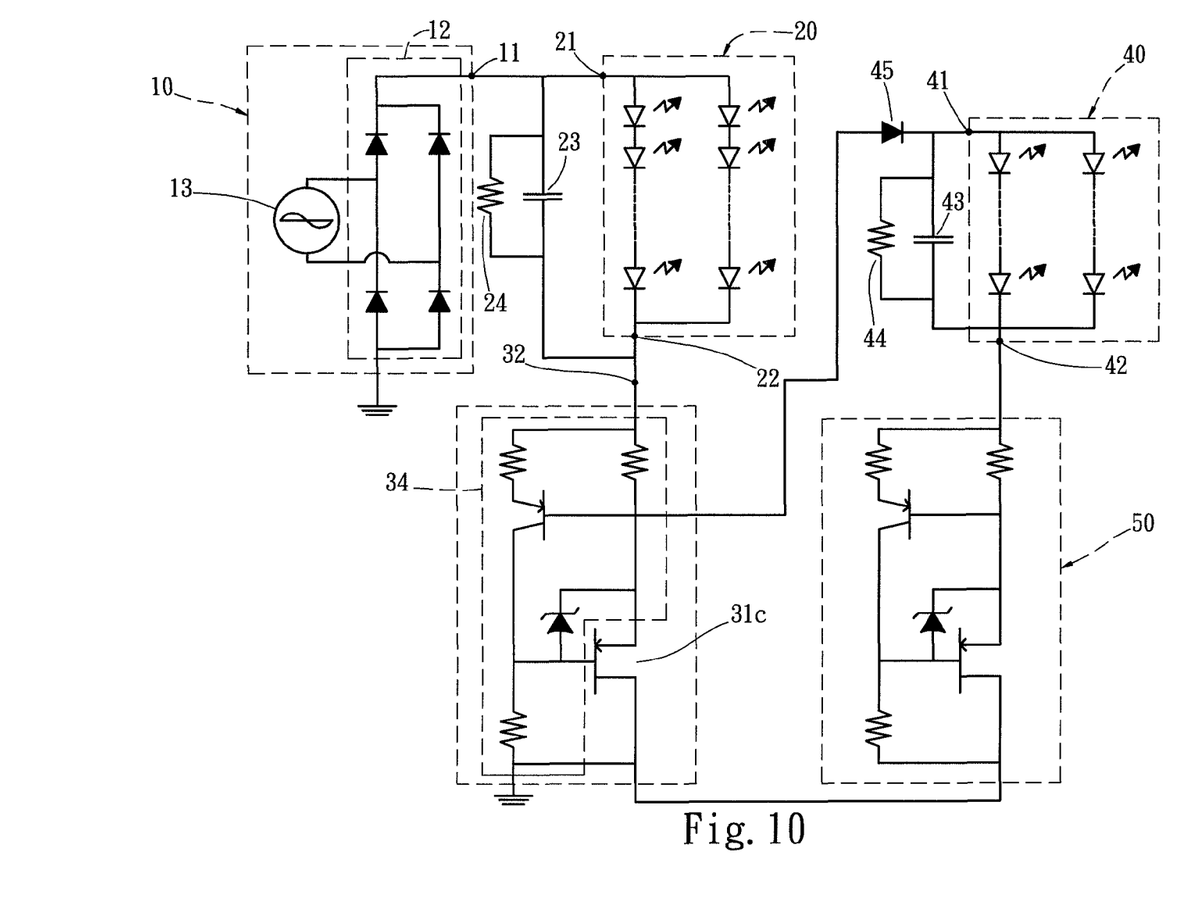
FIG. 10 is a schematic circuit diagram of an eighth embodiment of the invention.

Please refer to FIG. 10 for the circuit diagram of an eighth embodiment of the invention. It differs from the first embodiment by replacing the N-type power switch 31 by a P-type power switch to be the power switch 31c. The structure of the control circuit 34 can be changed according to the characteristics of the power switch 31c being used. In addition, NPN transistor or PNP transistor also can be adopted.

Figure 11:
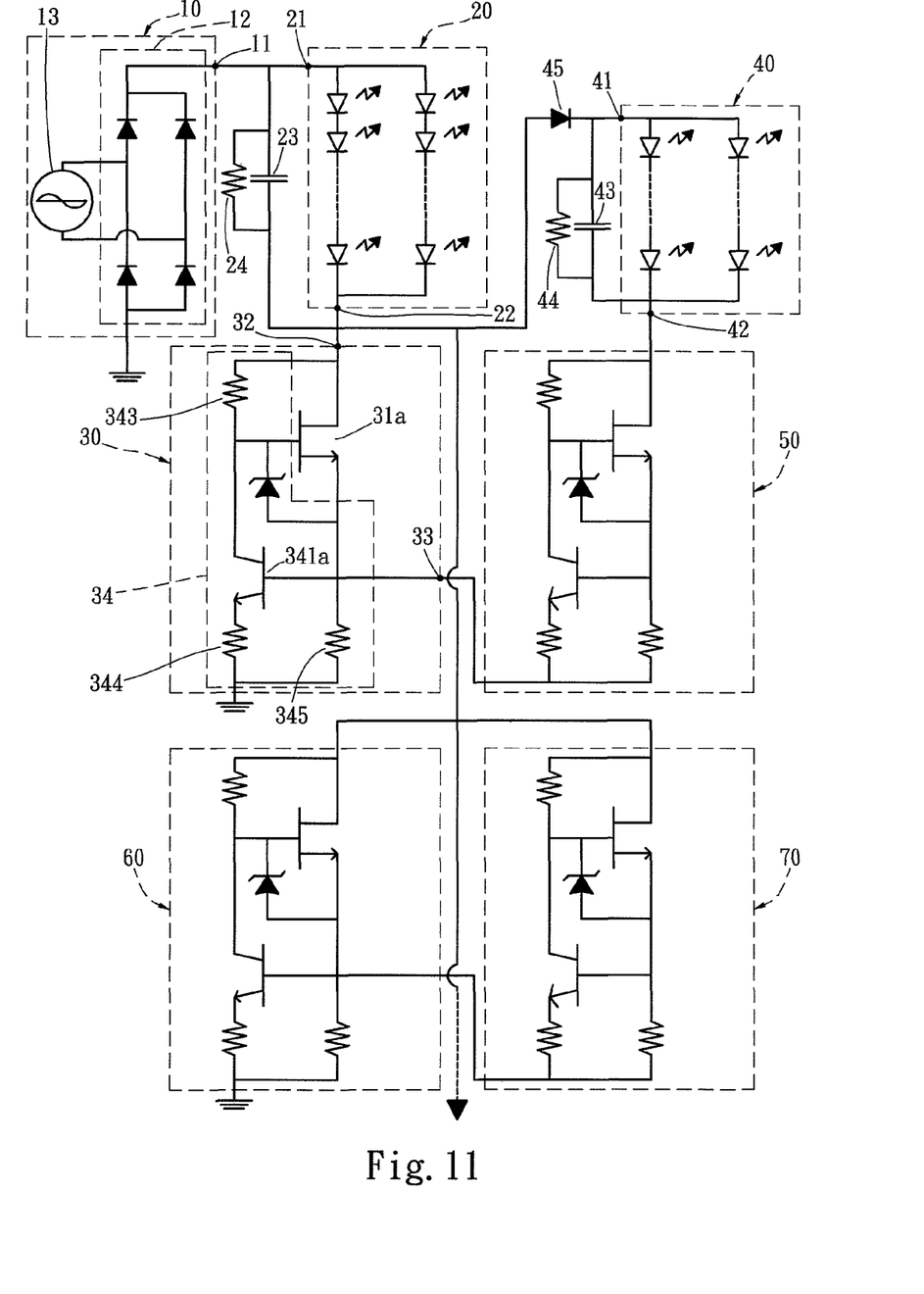
FIG. 11 is a schematic circuit diagram of a ninth embodiment of the invention.

Please refer to FIG. 11 for the circuit diagram of a ninth embodiment of the invention. It differs from the first embodiment by including a second voltage control unit 60 and a second power transfer unit 70 in the drive circuit that are coupled in parallel with the first voltage control unit 30 and first power transfer unit 50. Thus, when the power loss cannot be fully transferred and output from the first power transfer unit 50 to the second LED lamp string 40, the second power transfer unit 70 can aid to output the residual power loss to the second LED lamp string 40. It is to be noted that in this embodiment a third voltage control unit and a third power transfer unit, a fourth voltage control unit and a fourth power transfer unit and so on that are coupled in parallel with the second LED lamp string 40 also can be provided according to the amount of the power loss without limitation.

Figure 12:
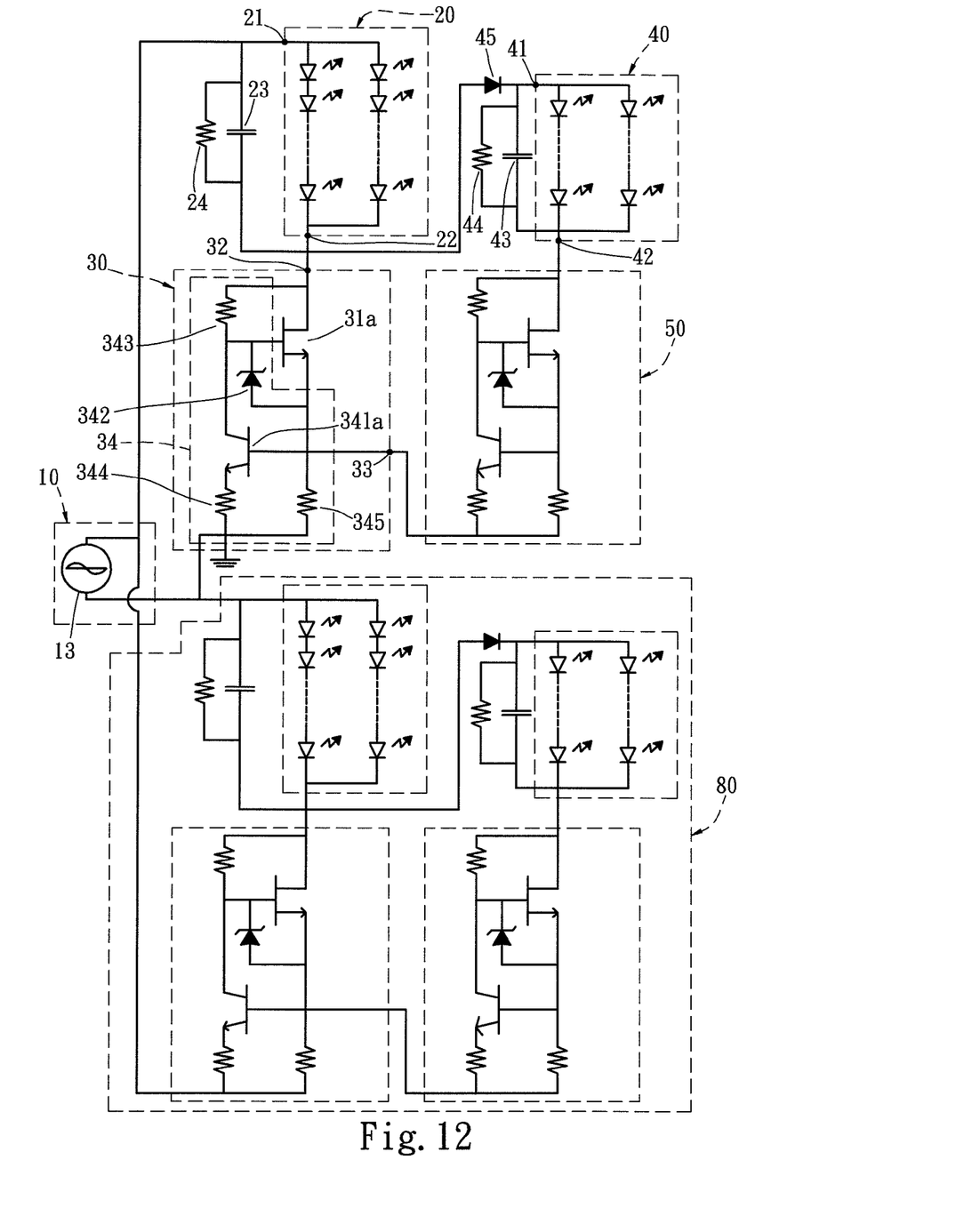
FIG. 12 is a schematic circuit diagram of a tenth embodiment of the invention.
Figure 13:
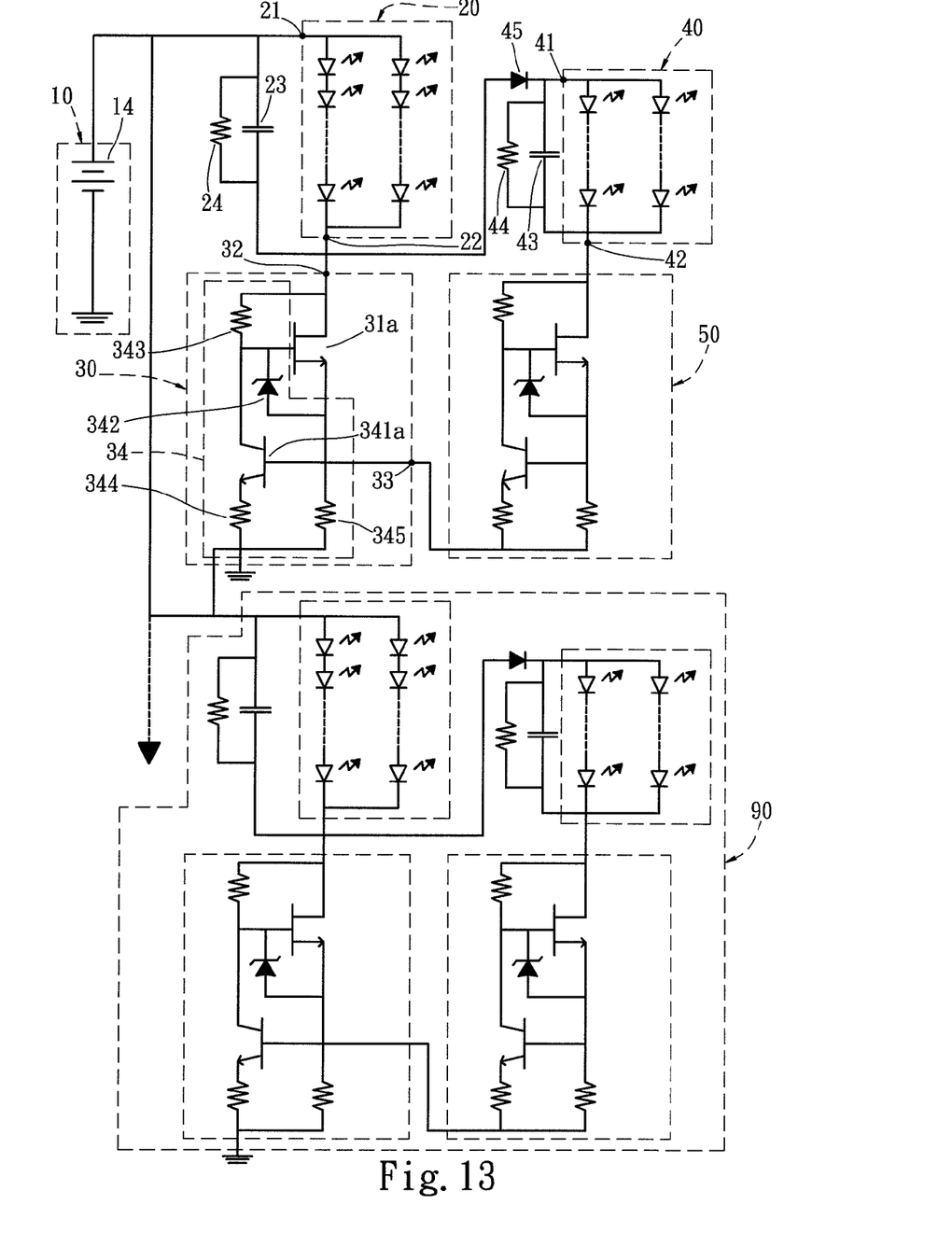
FIG. 13 is a schematic circuit diagram of an eleventh embodiment of the invention.

Please refer to FIG. 12 for the circuit diagram of a tenth embodiment of the invention. It differs from the first embodiment on the power supply unit 10 which is merely an AC power source 13. Hence, the drive circuit, according to the characteristics of AC power output from the AC power source 13, is coupled in series with the first LED lamp string 20, first voltage control unit 30, second LED lamp string 40 and a first circuit 80 the same as the first power transfer unit 50 to form an AC LED drive circuit Please refer to FIG. 13 for the circuit diagram of an eleventh embodiment of the invention. It differs from the first embodiment on the power supply unit 10 which is merely a DC power source 14. Hence, the drive circuit, according to the characteristics of DC power output from the DC power source 14, is coupled in parallel with the first LED lamp string 20, first voltage control unit 30, second LED lamp string 40 and a second circuit 90 the same as the first power transfer unit 50 to form a DC LED drive circuit.

Figure 14:
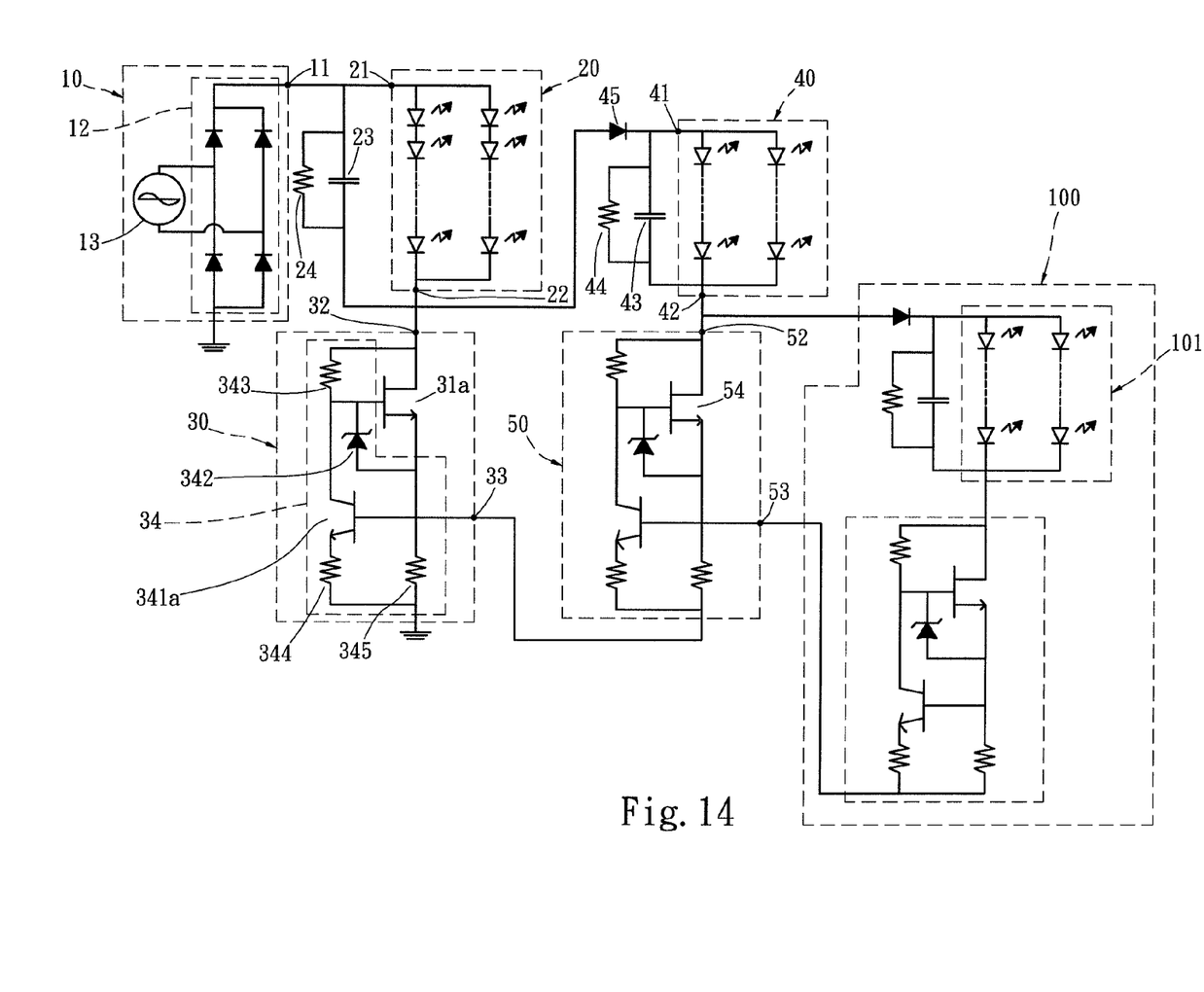
FIG. 14 is a schematic circuit diagram of a twelfth embodiment of the invention.

Please refer to FIG. 14 for the circuit diagram of a twelfth embodiment of the invention. It differs from the first embodiment by further including a first expansion unit 100 which has a circuit structure the same as that of the second LED lamp string 40 and first power transfer unit 50. In this embodiment, the first power transfer unit 50 is structured the same as the first voltage control unit 30 by having a first control end 52 and a first feedback end 53 corresponding respectively to the control end 32 and feedback end 33. The expansion unit 100 bridges the first control end 52 and first feedback end 53. Thus, when a first power switch 54 of the first power transfer unit 50 generates a first power loss, the first power loss is further transferred to the first expansion unit 100 to reduce the heating temperature of the first power switch 54 and also drive an LED lamp string 101 to emit light. Through the first expansion unit 100, total transfer efficiency can be enhanced. It is to be noted that a second expansion unit having the same structure as the first expansion unit 100 can be provided to couple with the first expansion unit 100, and a third expansion unit having the same structure as the second expansion unit also can be provided to couple with the second expansion unit, and so on to get improved transfer efficiency.

As a conclusion, the invention provides at least the following advantages:

1. Through the first voltage control unit, the problems of excessive power loss and easy interference occurring to the conventional switch-type power converter can be avoided.

2. By coupling the first power transfer unit and second LED lamp string with the first voltage control unit, the power loss generated on the power switch of the first voltage control unit is transferred and output to drive the second LED lamp string. Thus not only the problem of adding an extra cooling mechanism due to the high temperature caused by the power loss can be averted, the power loss also can be used for lighting the second LED lamp string to improve lighting performance of the drive circuit, thereby utilize energy resources more efficiently and save energy.

3. The invention does not require the switch-type power converter, thus can be simply structured at a lower cost to make, and also can be operated in a lower temperature and has improved stability.

4. Through the second voltage control unit and second power transfer unit, the amount of power loss can be regulated to get improved output transfer effect.

5. The invention further can effectively use the power loss to generate light through the first expansion unit to achieve improved transfer efficiency.

While the preferred embodiments of the invention have been set forth for the purpose of disclosure, they are not the limitation of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An LED drive circuit, comprising:
a power supply unit including an output end to output a drive power;
a first LED lamp string which is connected to the output end of the power supply unit and driven by the drive power and includes a first anode end connecting to the output end and a first cathode end, wherein the first LED lamp is coupled in parallel with a first capacitor and a first resistor to filter out ripple waves;
a first voltage control unit which is connected to the first cathode end to get the drive power and stabilize and provide a voltage to the first LED lamp string and includes a control end connected to the first cathode end, a feedback end, a power switch connected to the control end and the feedback end and a control circuit connected to the power switch, the drive power generating a power loss at the power switch, the control circuit including a third resistor which bridges a gate and a drain of the power switch, a voltage stabilization element which is connected to the gate of the power switch, a fourth resistor which is connected to an emitter of the voltage stabilization element and a fifth resistor which is connected to a gate of the voltage stabilization element;
a second LED lamp string connecting to the control end of the first voltage control unit via a rectification diode; and
a first power transfer unit coupling in series with the second LED lamp string and connected to the feedback end of the first voltage control unit;
wherein the first power transfer unit transfers and outputs the power loss generated on the power switch to the second LED lamp string to drive the second LED lamp string.

2. The LED drive circuit of claim 1, wherein the second LED lamp string is coupled in parallel with a second capacitor and a second resistor.

3. The LED drive circuit of claim 1, wherein the first voltage control unit includes a Zener diode connected to the power switch to provide voltage stabilization protection for the power switch.

4. The LED drive circuit of claim 1, wherein the voltage stabilization element is selected from the group consisting of an NPN transistor, a PNP transistor, an operational amplifier, serial-connected diodes and a Zener diode.

5. The LED drive circuit of claim 1, wherein the first power transfer unit is formed in a circuit structure the same as that of the first voltage control unit.

6. The LED drive circuit of claim 5 further including a first expansion unit which is connected to the first power transfer unit and formed in a circuit structure the same as that of the second LED lamp string and the first power transfer unit.

7. The LED drive circuit of claim 1, wherein the first power transfer unit includes a resistor.

8. The LED drive circuit of claim 1, wherein the power switch is selected from the group consisting of an N-type power switch, a P-type power switch, an NPN transistor and a PNP transistor.

9. The LED drive circuit of claim 1 further including a second voltage control unit and a second power transfer unit, the second voltage control unit and the second power transfer unit being coupled in parallel with the first voltage control unit and the first power transfer unit.

\* \* \* \* \*